April 25, 1933.  C. A. BROWN ET AL  1,905,791
APPARATUS FOR SORTING RODS AND TUBES
Filed Oct. 9, 1929  2 Sheets-Sheet 2

INVENTORS.
CARL A. BROWN,
FRANK B. VAN SICKLE
BY Charles E. Mullen
THEIR ATTORNEY Patented Apr. 25, 1933

1,905,791

UNITED STATES PATENT OFFICE

CARL A. BROWN, OF EAST CLEVELAND, AND FRANK B. VAN SICKLE, OF WICKLIFFE, OHIO, ASSIGNORS TO GENERAL ELECTRIC COMPANY, A CORPORATION OF NEW YORK

APPARATUS FOR SORTING RODS AND TUBES

Application filed October 9, 1929. Serial No. 398,516.

Our invention relates to apparatus for sorting rods, tubes, or similar articles according to the diameter thereof. According to our invention the articles are fed to a series of drums provided with slots of progressively larger width. Our invention is particularly adapted to the sorting of glass rods and tubing and provides a very convenient and efficient means for dividing the product into various sizes which may be utilized in the manufacture of incandescent lamps and similar articles. Various features and advantages of our invention will appear from the following description of a species thereof and from the accompanying drawings. Where the term "tube" or "tubing" is used, it will be understood to include solid rod or cane as well as the hollow tube or tubing.

Figure 1:
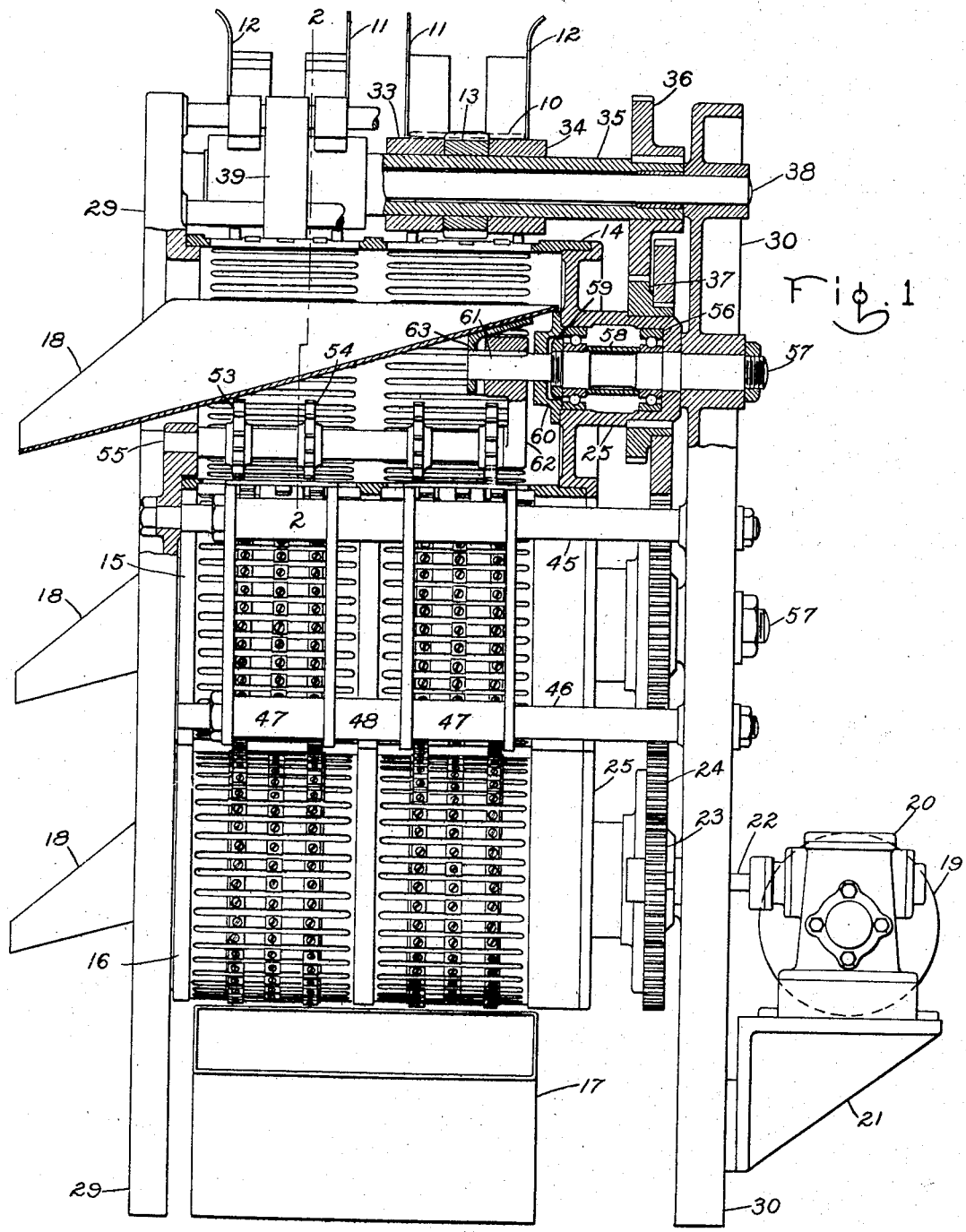
Figure 2:
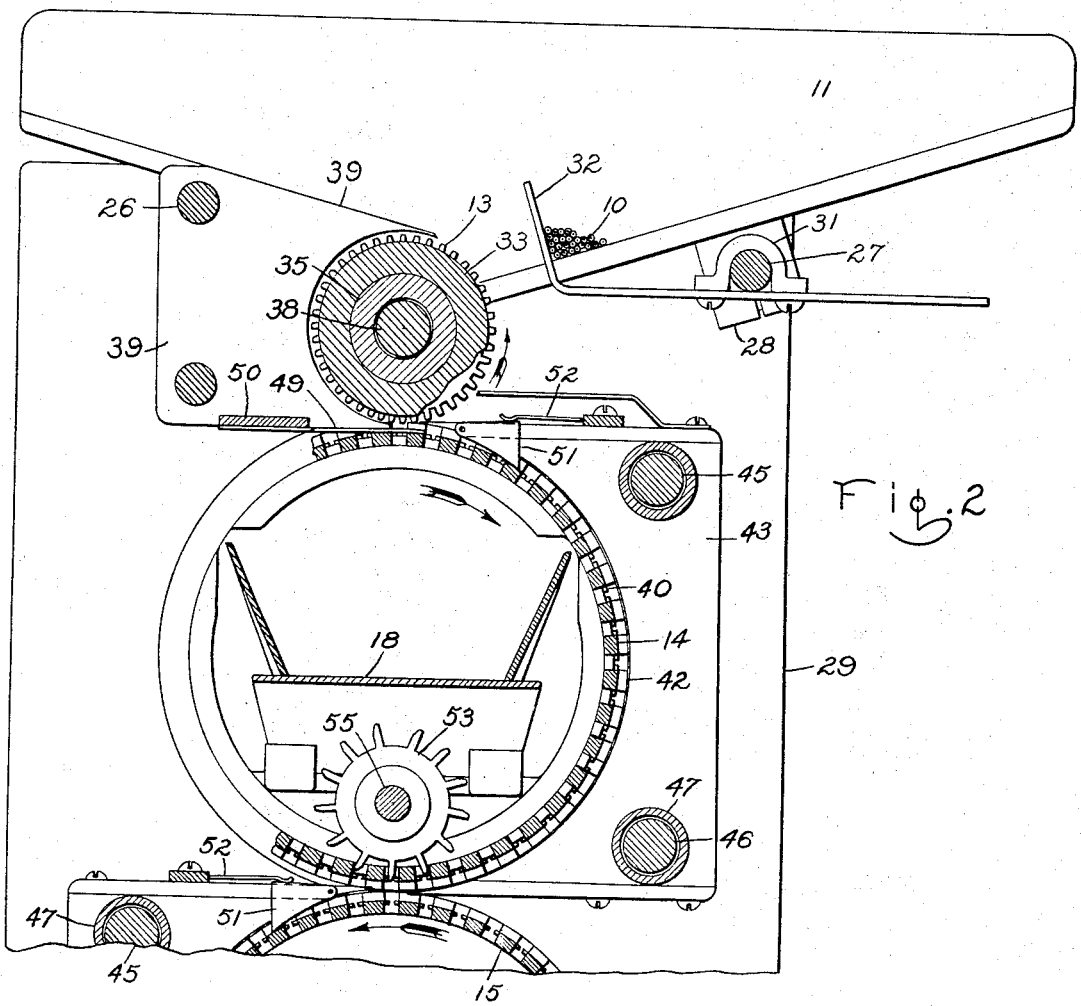
Figure 3:
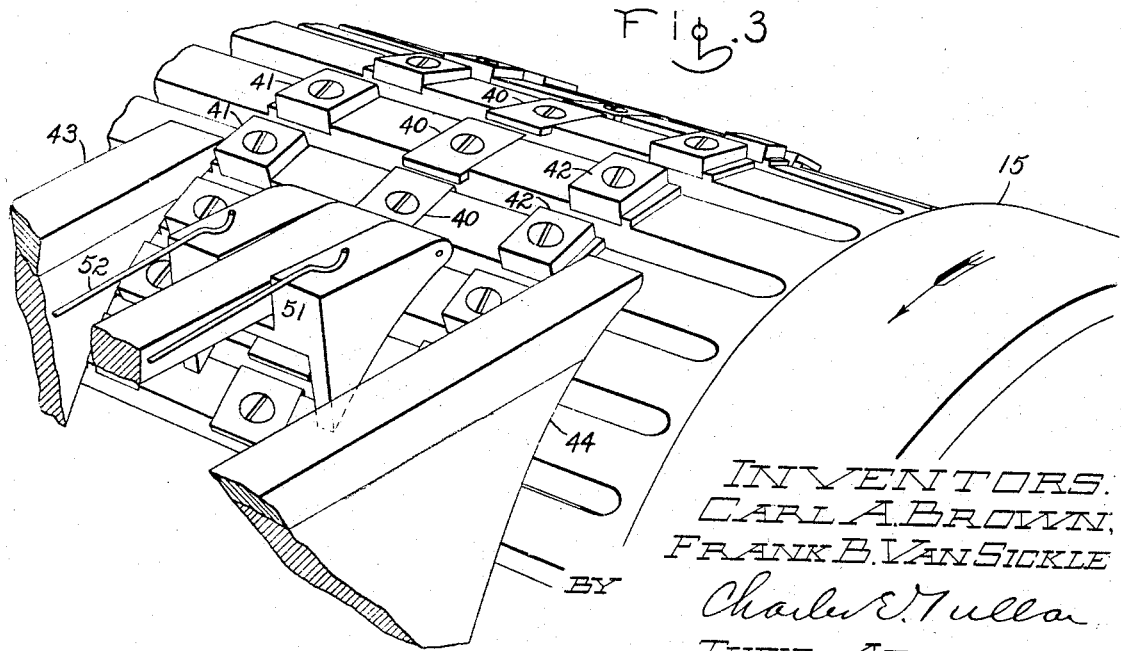

In the drawings, Fig. 1 is a side elevation of the machine of our invention; Fig. 2 is a section along the line 2—2 of Fig. 1; and Fig. 3 is a fragmentary perspective view of a sorting drum and some of its co-acting parts.

Referring now to the drawings, the lengths of tubing 10 are placed in the hopper 11 and 12 with their long axes parallel to that of the grading drums. On sliding down the inclined bottom of the hopper, each length is taken between teeth of the revolving gear 13 which carries it over and down to the first grading drum 14. This drum is provided with slots through which the length of tubing falls providing it has a lesser diameter than the width of the slot. Tubing of larger diameter will ride in these slots during the rotation of the drum until it is brought above a similar drum 15 having slots of slightly greater width. This drum 15 allows tubing varying in size between that of the first drum 14 and that of the second 15 to drop through. There is also a third drum 16 which completes the series. All tubing too large in diameter to fall through this drum is deposited in the box 17. To receive the tubing after it has dropped through the respective drums, there are chutes 18 which direct each size to its particular container.

The complete machine is driven from the usual electric motor 19 and worm gear speed reducer 20. The motor and speed reducer supported on the bracket 21 connect with the machine proper by means of the shaft 22 and the gear 23. Meshing with it there is the driving gear 24 of the third drum 16. This gear 24 is fastened to the housing 25 which supports and operates the drum. Other drums have like housings and gears which mesh with each other in the manner shown in Fig. 1 so that a given movement of one will produce a corresponding movement in all of the others.

On this particular machine there are two complete hoppers which feed to two rows of grading slots in the drums. Each hopper feeds into a separate row having an exact duplicate arrangement of parts, therefore only one row or set need be described. The rod or tubing as placed in the machine hopper is supported at one end by the section 11 of the machine hopper and at the other by the other section 12. These halves or sections are slidably mounted on the rods 26 and 27 through the block 28, thus allowing the machine to be adapted to any length tubing that will pass through the slots in the grading drums. The rods 26 and 27 as well as the complete machine are supported between the two sections of the frame 29 and 30. Swung from the rod 27 by the U strap 31 and between the halves of the hopper is the feed controlling lever 32. This lever when in the position shown in Fig. 2 holds the tubing from entering the feeding mechanism. Swinging the lever down out of the way allows the tubing to slide down the ways of the hopper into the spaces between the teeth of the feed gear 13. The said gear and the collars 33 and 34 rotate in the direction indicated in Fig. 2 because of their fixed position on the sleeve 35.

Pinned to the sleeve 35 is the large driving gear 36 in mesh with the gear 37 on the driven supporting housing 25 of the first drum 14. The speed of rotation of the sleeve 35 which rides free on the shaft 38 and consequently of the feeding gear 13 should be so related to that of the drum 14 as to allow a drum slot to be presented as each tube is delivered. Because of the collars 33 and 34, the tubing may enter between the teeth only a fixed distance and all excess tubing that piles upon the first will be brushed off by the block 39. The slots in drum 14 are set in width by the blocks 40.

In case the tubing is unable to pass through, it will be held in the groove formed by the blocks 41 and 42. These blocks with the assistance of the transverse plates 43 and 44 mounted adjacent to the said drum trap the tubing until the first drum has carried it to a position directly above the next grading drum. The plates are supported by the rods 45 and 46 and spaced by the two collars 47 and 48. As shown in Fig. 2, when the tubing enters the first grading drum it is kept from passing to the left and out of the machine by the spring 49. The cross plate 50 supports the spring at its further end. The tubing on moving to the right with the rotation of the drum is forced to pass below the block 51 (Fig. 3) which because of the spring 52 exerts a slight pressure tending to force the tubing through the slot.

On reaching a point above the second drum 15, the plates 43 and 44 no longer hold the tubing in the slot. At this point, clearing devices comprising cog wheels 53 and 54 are mounted so that the teeth project into the slots, thus removing all tubing that may have stuck. These cog wheels are rotated by the drum on the stationary shaft 55.

After the tubing has left the first drum 14, it is free to enter the second drum 15, similar to the first in every way except for the blocks 40 which are shorter and form larger openings or slots. If the tubing is still too large, it will pass in like manner to another drum with slots still wider than the second. The tray 17 takes the tubing which is rejected by the series of drums. Each grading drum is supported at an end by a boss extending from the frame 29 and at the other end by the housing 25. The drum fastens directly to the housing 25 but slides free on the frame 29. This housing with the aid of the ball bearings 56 rides free on the stationary shaft 57. Holding the bearings apart is the collar 58 while all three are held in place by the nut 59. As the bearings run in oil, the cap 60 bolted to the housing serves to seal it. Over the protruding end of the stationary shaft or spindle 61 and keyed to it are two brackets 62 and 63. The first of these brackets 62 supports the end of shaft 55 on which the cog wheels 53 and 54 ride, and the other the inner end of the chute 18.

What we claim as new and desire to secure by Letters Patent of the United States is:—

1. An apparatus for sorting rods, tubes or similar articles comprising a plurality of substantially horizontally disposed superposed drums each having longitudinal slots in the peripheral wall thereof, the widths of said sots being least in the uppermost and progressively greater in lower drums, means for rotating said drums, and plates spaced from said drums and each shaped to retain rejected rods or tubes as they are carried around the outside of one drum to the next drum below.

2. An apparatus for sorting rods, tubes or similar articles comprising a plurality of substantially horizontally disposed superposed drums each having longitudinal slots in the peripheral wall thereof, the widths of said slots being least in the uppermost and progressively greater in lower drums, means for rotating said drums, plates spaced from said drums and each shaped to retain rejected rods or tubes as they are carried around the outside of one drum to the next drum below, and spring pressed blocks each disposed over a drum and adapted to exert pressure on said rods or tubes to force them through the said slots.

3. An apparatus for sorting rods, tubes or similar articles comprising a plurality of substantially horizontally disposed superposed drums each having longitudinal slots in the peripheral wall thereof, the widths of said slots being least in the uppermost and progressively greater in lower drums, means for rotating said drums, plates spaced from said drums and each shaped to retain rejected rods or tubes as they are carried around the outside of one drum to the next drum below, and clearing wheels mounted within and near the bottom of said drums and having teeth engaging the lowermost slots to eject lodged rods or tubes.

In witness whereof, we have hereunto set our hands this 7th day of October, 1929.

CARL A. BROWN.
FRANK B. VAN SICKLE.